March 27, 1934.   E. H. REMDE   1,952,730
INDUSTRIAL TRUCK
Original Filed Oct. 23, 1926   4 Sheets-Sheet 1
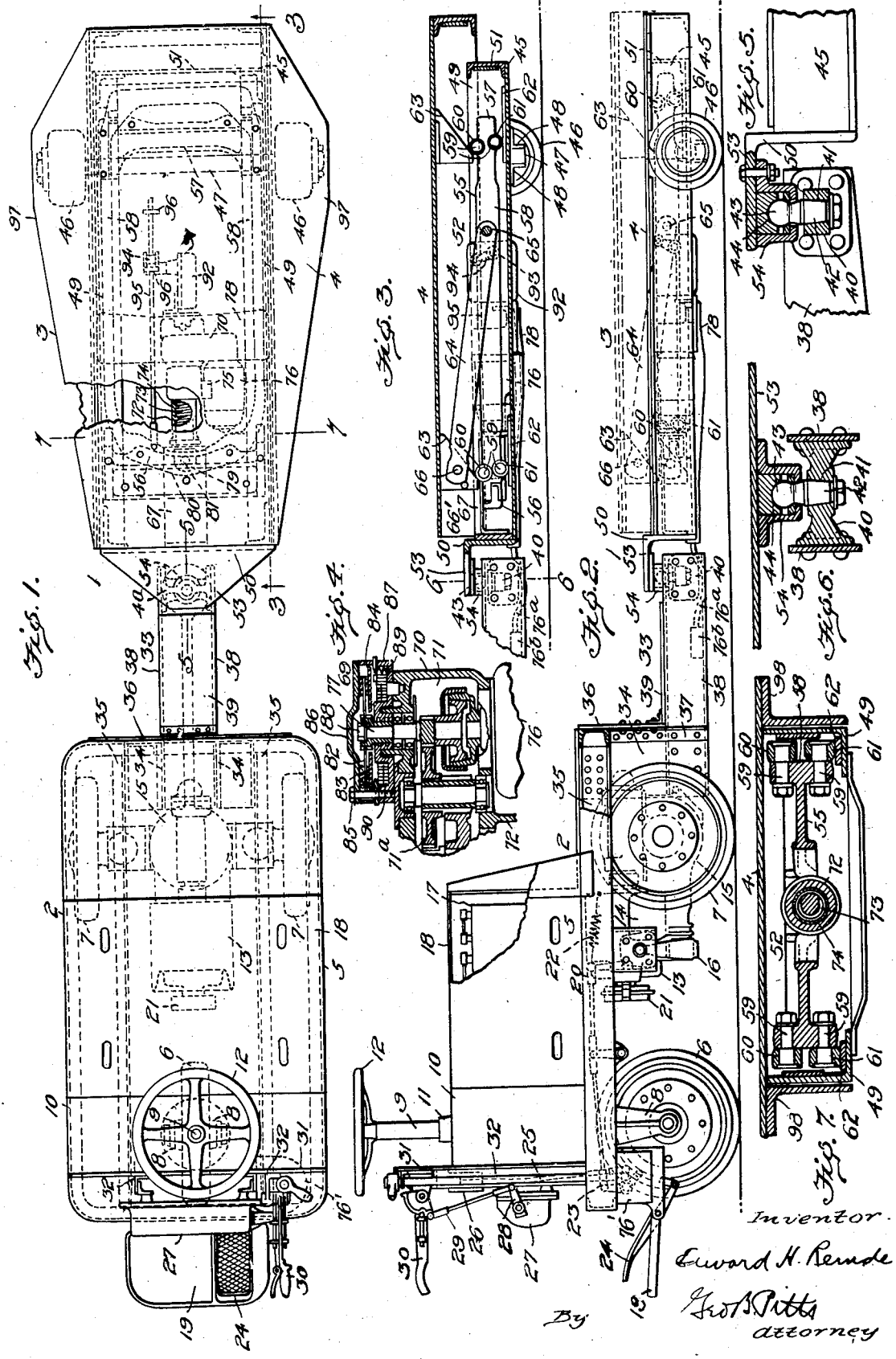

March 27, 1934.　　　　E. H. REMDE　　　　1,952,730
INDUSTRIAL TRUCK
Original Filed Oct. 23, 1926　　4 Sheets-Sheet 2
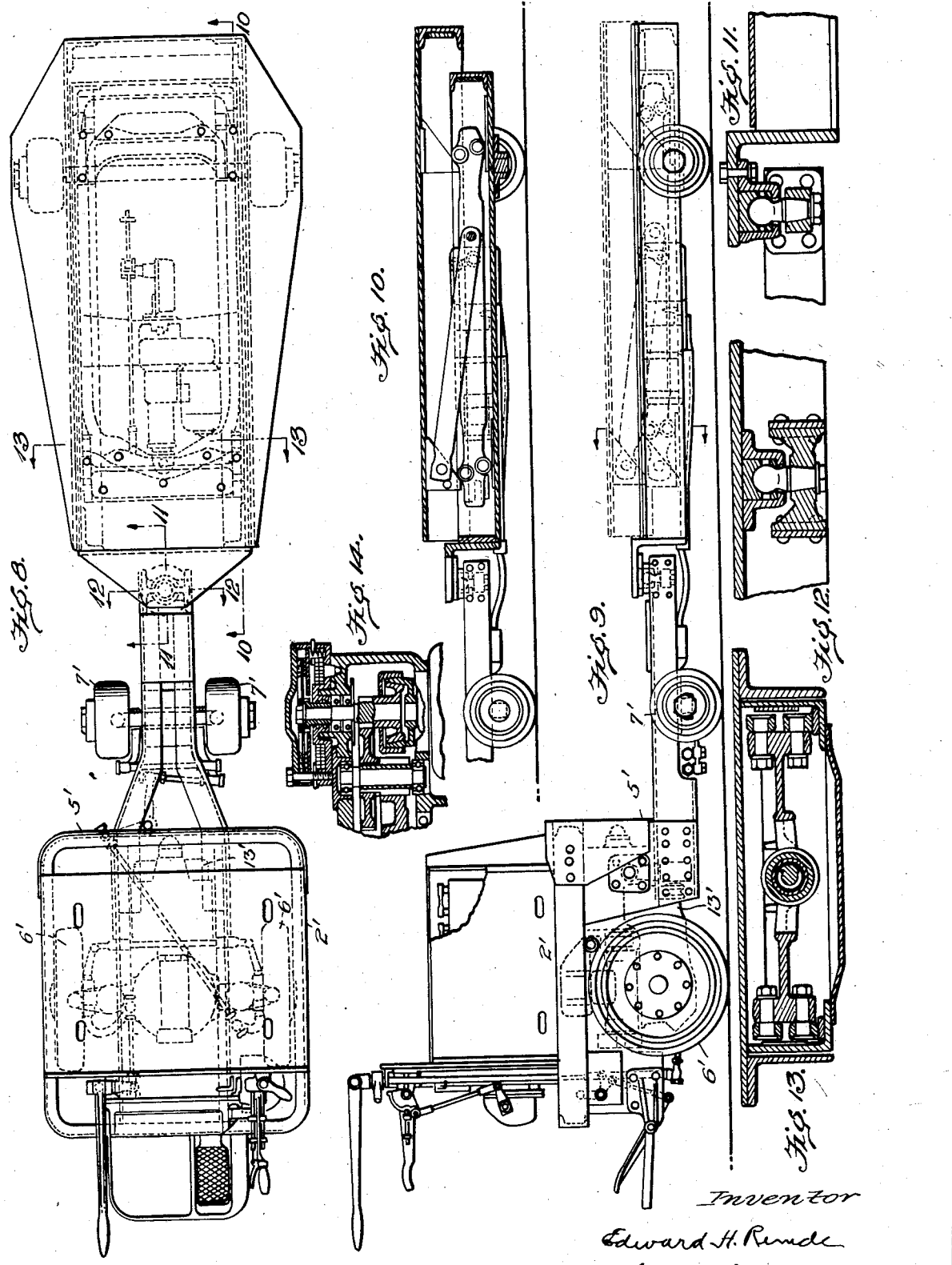
Inventor
Edward H. Remde
By Geo. B. Pitts
Attorney March 27, 1934.    E. H. REMDE    1,952,730
INDUSTRIAL TRUCK
Original Filed Oct. 23, 1926    4 Sheets-Sheet 3
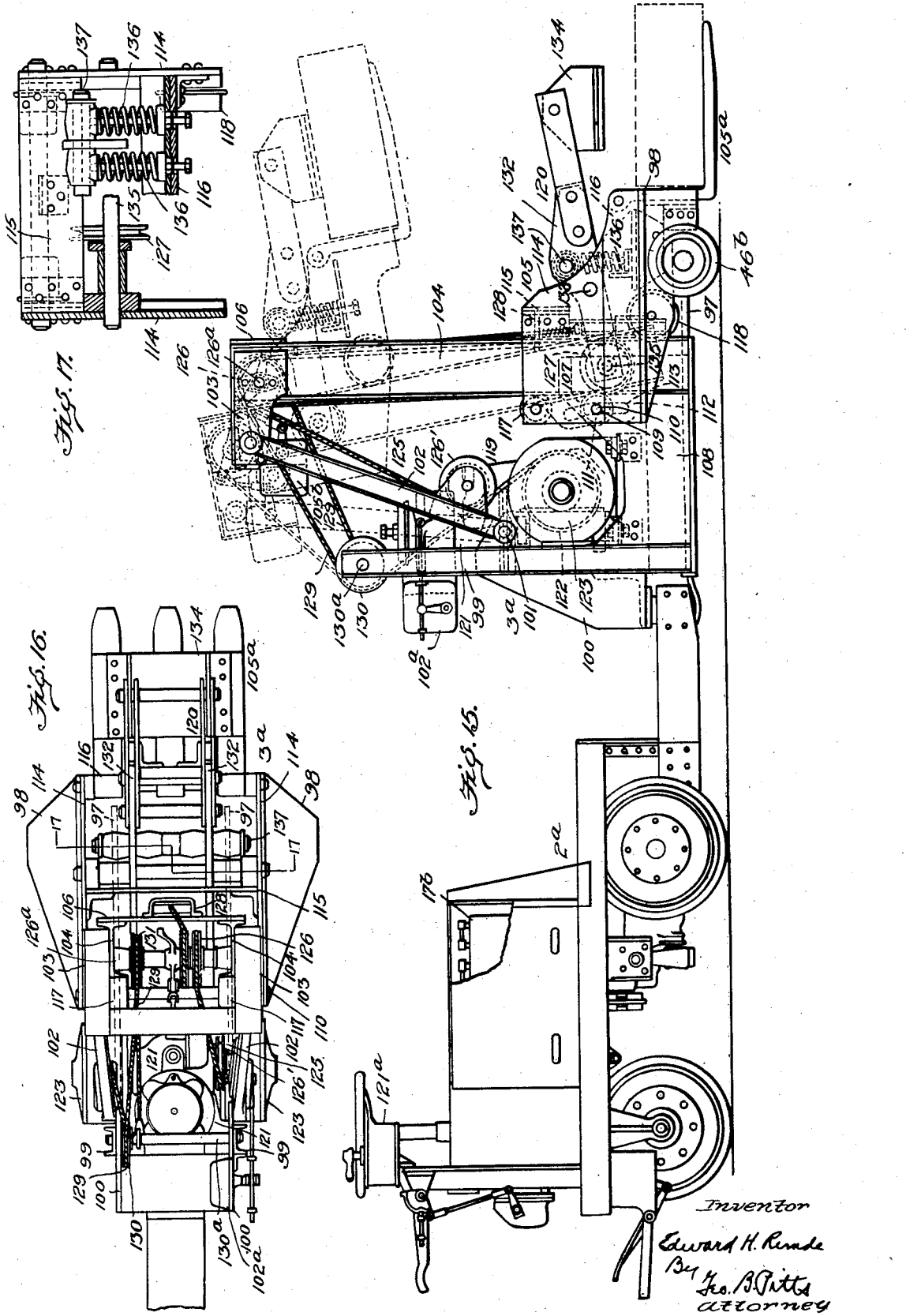

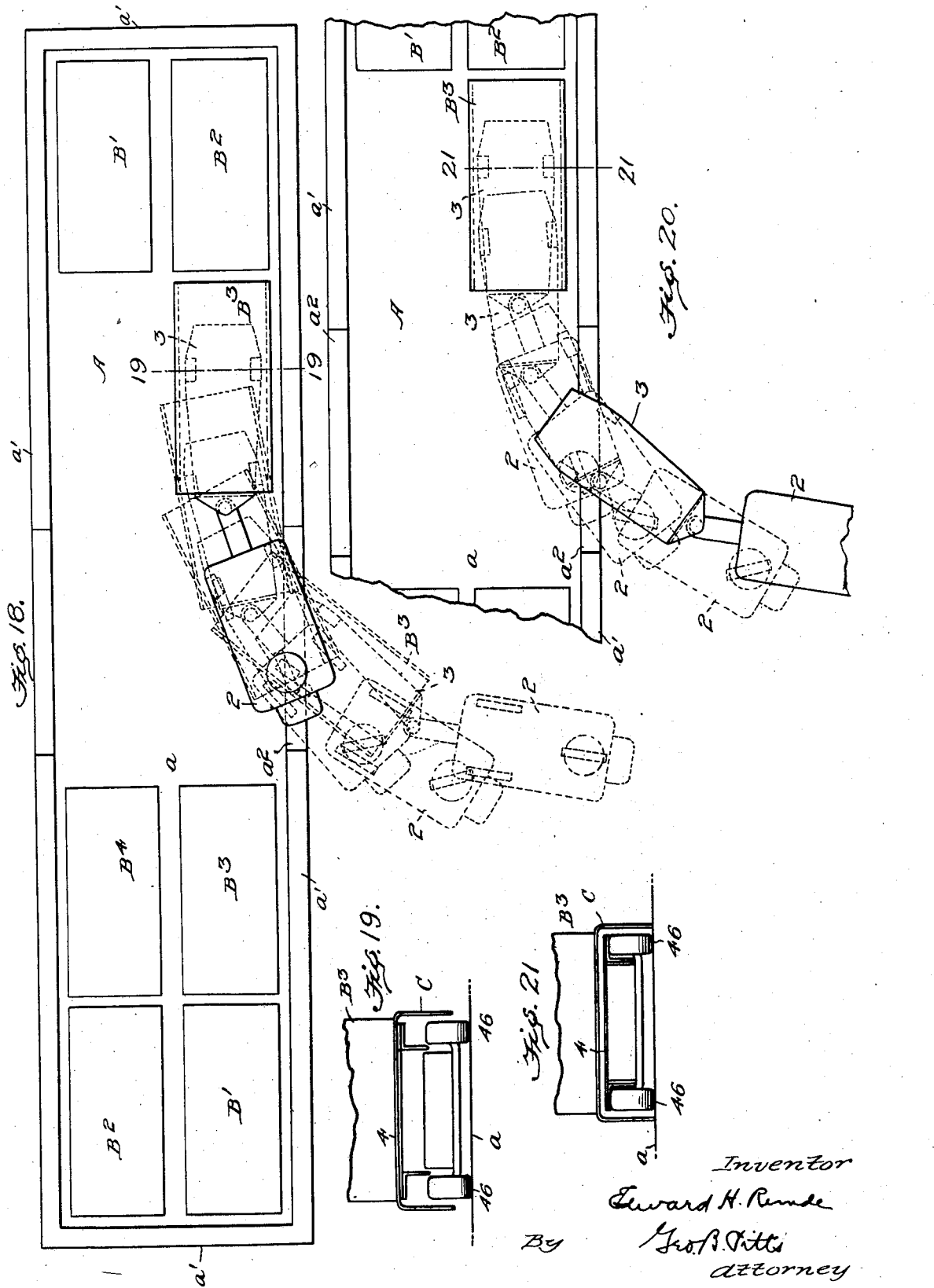

Patented Mar. 27, 1934

1,952,730

UNITED STATES PATENT OFFICE 1,952,730

INDUSTRIAL TRUCK

Edward H. Remde, Cleveland, Ohio, assignor to The Baker-Raulang Company, Cleveland, Ohio, a corporation of Ohio Original application October 23, 1926, Serial No. 143,701. Divided and this application September 12, 1928, Serial No. 305,569. Renewed August 19, 1933

2 Claims. (Cl. 280—33.1)

My invention relates to an industrial truck, more particularly a truck of the articulatable or sectional type.

This application is a division of my original application Ser. No. 143,701, filed October 23, 1926.

Heretofore great difficulty has been experienced in mechanically loading carriers, such as freight cars of the box type to full capacity, particularly where the load units were of large size, due to the fact that the trucks, which are usually of the elevating type could not be operated to carry the loads into the car, place them in their final position and then the empty truck driven away. Where the loads were of relatively large size and only a limited number were required to fill the car, elevating or tiering trucks have been found to be impractical because only one or two load units, if any, could be transported into and positioned in the car, thereby leaving the remainder to be handled manually.

By means of my improved truck I am enabled to handle all of the load units required to completely fill a car to either load the car therewith or to unload the units therefrom readily and in an economical manner with respect to both time consumed and labor required, as well as with less danger of damaging the loads.

One object of the invention is to provide an improved truck of this character having a load lifting mechanism on its load carrying portion.

Another object of the invention is to provide an improved truck of this character having an elevating means on its load carrying portion capable of being manipulated and controlled to pick up or discharge loads in carriers and in limited areas, whereby the range of loading and unloading operations is greatly increased and facilitated.

Other objects of the invention will be apparent to those skilled in the art to which my invention relates from the following description taken in connection with the accompanying drawings, wherein Fig. 1 is a plan view of a truck embodying my invention.

Fig. 2 is a side view of the truck.

Fig. 3 is a fragmentary section on the line 3—3 of Fig. 1.

Fig. 4 is a fragmentary plan view of the motor and driving means, partly in section.

Fig. 5 is a fragmentary section of parts shown in Fig. 3 on the line 5—5 of Fig. 1.

Fig. 6 is a section on the line 6—6 of Fig. 3.

Fig. 7 is a section on the line 7—7 of Fig. 1.

Fig. 8 is a plan view of a truck embodying my invention, but showing a modified form of construction.

Fig. 9 is a side view of the truck shown in Fig. 8.

Fig. 10 is a fragmentary section on the line 10—10 of Fig. 8.

Fig. 11 is a fragmentary section on the line 11—11 of Fig. 8.

Fig. 12 is a section on the line 12—12 of Fig. 8.

Fig. 13 is a section on the line 13—13 of Fig. 8.

Fig. 14 is a fragmentary plan view of the motor and driving means, partly in section.

Fig. 15 is a side elevation of a truck embodying my invention, but showing another modified form of construction.

Fig. 16 is a fragmentary plan view of parts shown in Fig. 15.

Fig. 17 is a section on the line 17—17 of Fig. 16.

Fig. 18 is a diagrammatic view showing the partial loading of a freight car in carrying out my process.

Fig. 19 is a section on the line 19—19 of Fig. 18.

Fig. 20 is a view similar to Fig. 18, but showing the manner of removing the truck.

Fig. 21 is a section on the line 21—21 of Fig. 20.

My improved truck may be of different forms of construction to suit varying conditions and particularly the size, shape and nature of the body or load unit to be lifted, transported and positioned in a carrier, such as a freight car or other compartment or in and among objects, bodies or stacked goods and merchandise.

I use a jointed or two-part truck capable of turning in a relatively short radius and effecting positive control and movement of the load carrying portion of the truck; if the load units to be handled are relatively large and are not to be stacked one on the other, I prefer the form of truck construction shown in Figs. 1 to 7, inclusive, but if the load units are to be stacked in piles, I may use the form of truck construction shown in Figs. 15, 16 and 17, this latter form of construction as illustrated herein being particularly adapted for handling sheets of material in bundles.

Where the picking up or positioning of load units takes place in plants, warerooms, wharves and the like and somewhat more space can be utilized for the operation of the truck, I may use the form of construction shown in Figs. 8 to 14, inclusive, altho the forms of construction shown in Figs. 1 to 7, inclusive, are equally adapted for use under these conditions.

Referring to Figs. 1 to 7, inclusive, the truck 1 comprises articulated portions or members 2, 3, the former serving as the traction and combined steering and control portion or member and the latter serving as the load handling and carrying portion or member, capable of picking-up a load unit and elevating it, holding it in elevated position while the truck is being driven to the unloading position or station and then discharging it; this latter operation in the illustrated form of construction being effected by the lowering of the elevating section or element, to wit, the platform 4.

The traction member 2 comprises a suitable frame 5, supported by wheels 6, 7. The wheel 6 is supported between the forks 8 of a column 9, provided with a steering wheel 12, and suitably mounted to rotate in the frame 5 and a super-frame 10, the bearing for the upper portion of the column in the latter frame being shown at 11. The wheels 7 are driven through a suitable power transmission mechanism by a motor 13. The motor 13 is mounted in and secured to a cradle 14 which is shaped to form a housing 15 for the power transmission mechanism. The cradle 14 and housing 15 are preferably connected to the frame 5 by a suspension mechanism, one element of which is shown at 16. No claim is made herein to such mechanism since the same forms the subject-matter of an application Ser. No. 430,620 filed by John H. Hertner of Cleveland, Ohio, and myself jointly (see Letters Patent 1,628,145). 17 indicates the source of power supply, that illustrated comprising batteries suitably connected to the motor 13 and also the motor for operating the loading handling mechanism to which reference will later be made. The batteries 17 are mounted on the frame 5 and may be enclosed in a casing 18. 19 indicates the platform on which the operative stands. 20 indicates as an entirety a brake mechanism, the braking elements of which engage a wheel 21 fixed to the extended end of the shaft for the motor 13, being normally engaged therewith by means of a spring 22. The braking elements are connected by a suitable linkage 23 to a foot pedal 24, associated with the platform 20 in convenient position for the operative to operate. When operated downwardly, the pedal 24 releases the braking elements from the wheel 21 and also, through a linkage 25, closes a switch in the motor circuit; this switch being mounted in a box or casing 26. 27 indicates a controller of any well known construction, being connected through an arm 28 and link 29 to a handle 30 in convenient position for operation by the operative. 31 indicates a dash mounted on uprights 32.

33 indicates a connector extending outwardly from and preferably in a plane below the frame 5. The connector is connected to the lower ends of a pair of drop plates 34, the upper portions of which are inclined outwardly and connected to the sill 35 forming part of the frame 5. The plates 34 may be braced by a plate 36 connected thereto by angles 37. The connector 33 may comprise two channel bars 38 having their flanges in opposed relation and connected by a plate 39. 40 indicates a bridge member disposed between and connected in a well known manner at its opposite ends to the channels 38. Midway between its ends, the bridge member 40 is formed with a tapered opening 41 in which is removably mounted the tapered wall of a pin 42 carrying at its upper end a ball 43. The ball 43 fits into a socket 44, suitably carried by the load handling and carrying member 3, whereby the ball and socket constitute a universal joint or connection between the truck members 2, 3, serving to support the inner end of the member 3 on the connector and to permit said members to articulate either due to change in inclination of the flooring or surfaces over which the truck is driven or to the steering of the truck and also control of either or both truck members to effect loading and unloading operations.

As shown in Figs. 5 and 6, the flanges of the channels 38, at their free ends, are cut away to accommodate the ball 43 and socket 44 and permit their free movement.

The load handling and carrying member 3 comprise a frame 45 mounted on a plurality of wheels 46. In the illustrated form of construction I provide two wheels, suitably mounted on an axle 47 and preferably disposed intermediate the ends of the frame 45 and secured thereto by angles 48. The frame 45 consists of angle bars 49 connected together at their front ends by an angle 50 and at their rear ends by a channel 51, the flanges of the angles 49 being turned inwardly to form a support for the elevating mechanism 52. The overhanging flange 53 of the angle 50 supports on its under side a suitable casing 54 in which is mounted the socket 44.

The elevating mechanism 52 may be of any desired construction to raise and lower the platform 4, but by preference such mechanism is substantially similar to that disclosed in Letters Patent No. 1,527,136, dated February 17, 1925, which issued upon the application of John H. Hertner.

The elevating mechanism 52 comprises generally a frame 55 having end members 56, 57, and side members 58.

At its opposite ends, the walls of the frame 55 are thickened and formed with openings in which are mounted stub shafts 59. The upper shafts 59 carry the rollers 60, while the lower shafts carry rollers 61 which engage suitable guides 62 on the inturned flanges of the angles 49 and permit the frame 55 to move endwise horizontally in opposite directions to effect the raising and lowering of the platform 4. The lowermost or normal position of the platform 4 is shown in Figs. 2 and 7. When the platform 4 is in this position, the intermediate frame 55 is arranged adjacent to that end of the frame 45 remote from the batteries (see Fig. 2) and when moved forward, it operates through the engagement of the rollers 60 with inclines 63 suitably secured to the lower side of the platform 4, to elevate it to the position shown in Fig. 3. The platform 4 is held against longitudinal movement by a pair of links 64 preferably pivoted at their opposite ends in any well known manner to the frame members 49 and platform 4, as shown at 65, 66. As will be understood, the links 64 permit the platform 4 to move in a substantially vertical direction, but hold it against longitudinal movement in order that the rollers 60 may co-act with the inclines 63 to elevate the platform. 66' indicates means for maintaining the frame 55 in sliding engagement with its guides 62 thereby preventing tilting of the frame 55 or movement of its inner end upwardly due to the positioning of a load at or adjacent its outer end. The means 66' are preferably carried by the angle 50. In the illustrated form of construction, the means 66' comprise a plate 67 extending over the frame 55 and having a downwardly bent section which is secured to the angle 50.

69 indicates the power mechanism for moving the frame 55 forwardly and rearwardly on the guides 62 to effect the raising and lowering of the platform 4. Of this mechanism, 70 indicates a hollow casing forming a suitable chamber 71 for speed reducing gears 71a and a chamber 72 for a screw or worm 73 and a nut 74.

75 indicates a cradle or other suitable device for connecting an electric motor 76 to the casing 70, preferably that portion thereof forming the chamber 72. The motor 76 is supported so that it may be readily connected to a shaft 77 (see Fig. 4) of the gearing within the casing 70. The motor 76 is arranged to rotate the screw or worm 73 in either direction to raise or lower the platform 4. The motor 76 and casing 70 are rigidly connected to the frame members 49 or the cross member 78. The motor 76, speed reducing gears and other elements, forming part of the power mechanism are preferably constructed similarly to corresponding parts set forth in Letters Patent No. 1,505,889 dated August 19, 1924, and therefore further description will not be necessary herein.

The nut 74 preferably comprises a hollow thrust member, which slidably fits at its inner end into an opening, leading into the chamber 72. The outer end of the nut 74 is bifurcated at 79 to receive between them the web portion 80 or a lug carried by the intermediate frame 55. The bifurcations 79 and web portion 80 are formed with openings, adapted to register with each other to receive a pin 81, whereby the nut and frame 58 are connected together.

The motor 76 is supplied with current from the batteries 17 by a cable 76a, having a plug connection with a socket 76b carried on the connector 33 (see Figs. 2 and 3). The cable 76a carries the desired number of wires to effect operation of the motor 76. The operation of the motor 76 is controlled by a controller 76' located in convenient position to the operative.

The shaft 77 extends through the casing 70 and carries on its outer or free end a disk 82, which constitutes one element of a brake 83. The other element of the brake consists of a disk 84 held against rotation by, but slidable on, a series of bolts 85 which secure the cover 86 to a plate 87 having a boss fitting into the opening in the casing 71 for the motor shaft and secured therein by the shoulder of a sleeve secured on the outer end of the shaft 77 by a nut 88, the latter also securing the brake element 82 to the shaft. The non-rotatable disk 84 is normally pressed outwardly by a plurality of springs (one being shown at 89 in Fig. 4) into engagement with the disk 82 to brake it or hold it against rotation. The disk 84 is formed of soft iron and is operated inwardly, against the tension of the springs 89, by a winding 90, when the latter is energized. The winding 90 is connected in series with the motor 76, so that when the latter is started the coil is energized and the brake released.

The limit switch mechanism 91 comprises a casing 92 suitably secured to the cross member 78 and enclosing a pair of switches either of which is opened to break the motor circuit by a device preferably operated by the rock shaft 93. 94 indicates an arm fixed to the rock shaft 93. The outer end of the arm is bifurcated and formed with aligned openings to receive a rotatable plug which is slotted to slidably receive a bar 95. The inner end of the bar 95 is pivotally connected to the frame 55; its outer portion is provided with adjustable tappets 96 disposed on opposite sides of the arm 94, whereby movement of the frame 55 in either direction will move one of the tappets into engagement with the arm 94 and cause it to swing and thus rock the shaft 93 which in turn will open one of the switches and break the motor circuit when the platform 4 reaches its limit of movement in either direction. The platform 4 is preferably extended outwardly beyond the frame 45 and has lateral portions 97 forming guards for the wheels 46. The side edges of the platform may be reinforced by the angles 98.

From the foregoing description it will be seen that my truck consists of articulated portions or members and that by steering the wheel 6 and driving the wheels 7, the inner end of the frame 5 may be swung in either direction as driving forwardly or backwardly takes place, and these movements of the frame 5 serve to turn and drive the frame 45 in rectilinear and curvilinear directions at the will of the operative, with the result that the load carrying member 3 can be positively controlled to position it below a load or to discharge the load in any desired position, in or among obstructions where an ordinary elevating truck would be incapable of movement endwise, and also to effect loading and unloading of a maximum number of loads in a predetermined space, as hereinafter set forth. This form of construction also permits the truck to be driven through lanes having relatively short angular turns.

In Figs. 18 and 20 I have shown certain steps of my process in completely loading a freight box car, which is shown diagrammatically in plan at A, the flooring being shown at $a$, the side and end walls at $a'$, and door openings at $a^2$.

In these views four units ($B'$, $B^2$, $B^3$, $B^4$) have been loaded at one end of the car and two units ($B'$, $B^2$) have been loaded at the other end of the car and unit $B^3$ is being positioned therein, the dotted lines showing the positions which the truck occupies in being driven into the car, discharging this unit and in being driven out.

As will be understood from Figs. 19 and 21, the units are mounted on skids C, but when the load engaging member is movable into close relation to the floor, the units may be mounted on suitable blocks or strips to permit the projecting of the load engaging member below the load unit.

In Figs. 8 to 14 inclusive, I have shown a slightly different form of truck construction wherein the traction member 2' is mounted on four wheels 6', 6', 7', 7', the former being driven by the motor 13' and all four wheels being steerable, and the frame 5' being, by preference, so constructed and arranged that the wheels may be relatively small.

In the form of construction shown in Figs. 15, 16, and 17, I have shown a tiering type of truck permitting the load units to be stacked one on another or removed from their stacked positions. In these views, $2a$ indicates as an entirety the traction portion of the truck (which may be similar in construction to the traction portion shown in Figs. 1 and 2) and $3^a$ indicates as an entirety the load handling portion or member comprising a pair of frame sills of channels 97 connected by a plate 98 and rigidly supporting a pair of upright channels 99. The plate 98 is extended laterally at either side to cover and protect the wheels 46b. 100 indicates a pair of plates suitably connected to the channels 99 and forming brackets for a rod or shaft 101 on which are swingably mounted a pair of bars 102. The upper ends of the bars are pivotally connected to brackets 103, which in turn are rigidly connected to a pair of I-beams 104 constituting a guide frame for an elevating member 105, the I-beams being connected in rigid relation by suitable devices, one of which is a plate 106. In the present illustrated form of construction, the guide frame is swingably supported by the bars 102, so that when the latter are operated in the manner to be later described, the guide frame is elevated and swung rearwardly, the effect of which movement is to tilt the elevating member, whereby the load thereon can be transported with less danger of its being jarred off. In this form of construction an interlocking slidable, pivotal connection 107 is provided between the lower portion of the guide frame and the frame 97. The connection 107 preferably comprises a pair of plates 108 secured to the sills 97 and formed with aligned openings 109 to receive a shaft 110. The shaft loosely supports a pair of rolls 111 on which the I-beams roll as they are operated from the full line position to the dotted line position shown in Fig. 15. The I-beams 104 support a pair of rearwardly extending arms 112 having formed in them aligned elongated slots 113 through which the shaft 110 extends. The rolls 111 permit the I-beams 104 to slide and also swing relative to the frame 97 and the engagement of the shaft 110 with the walls of the slots 113 connect the beams to the plates 108.

The elevating member 105 comprises a pair of plates 114 preferably disposed on the outer sides of the beams 104 and connected by transverse members 115, 116. The plates 114 carry pairs of guide rollers 117, 118, arranged to engage the I-beams and thus slidably support the elevating member 105 thereon.

At their outer ends the plates 114 support a transverse rod or shaft on which is pivotally mounted the load engaging and supporting element 105a preferably comprising a plurality of L-shaped arms, whereby their horizontal legs may be disposed relatively close to the floor.

The mechanism, indicated as an entirety at 119, for raising and lowering the elevating member and for swinging or tilting the guide frame to tilt the load is substantially similar to corresponding elements shown and described in and forming the subject-matter of my co-pending application Ser. No. 48,421, Patent No. 1,777,476, dated Oct. 7, 1930, except that such mechanism has associated with it a load gripping or clamping means indicated as an entirety at 120, which means forms the subject-matter of another co-pending application Ser. No. 138,763, Patent No. 1,843,736, dated Feb. 2, 1932, for which reasons no claim is made herein to such mechanism or such means.

Referring to the mechanism 119 for raising and lowering the load and tilting the guide frame, 121 indicates a motor connected to and operating a suitable differential mechanism housed in the casing 122. 121a indicates a controller connected in the circuit between the motor 121 and the batteries 17b. The sections driven by the differential mechanisms are connected to two drums 122 within casings 123. The drums 122 are normally locked by magnetically controlled brakes (not shown), the coils of which are connected in series with the motor circuit in such manner that either may be energized and the adjacent brake released, dependent upon the operation of a selector (not shown) when the controller is operated to drive the motor 121 in either direction. Accordingly, by the release of one drum 122 or the other, the load may be moved vertically or the guide frame swung in either direction. The power means and braking or locking devices and the release means therefor forms the subject-matter of a co-pending application Ser. No. 679,605, Patent No. 1,777,475, dated Oct. 7, 1930, for which reason no claim is made thereto in this application. 125 indicates a cable reeved over or around a guide sheave 126' mounted on the adjacent bar 102 and over and around sheaves 126 suitably supported on a shaft 126a on the upper end of the guide frame and a sheave 127 supported on the elevating member 105 in the manner to be later set forth, the inner end of the cable being arranged to wind on and off one of the drums 122 and its opposite end being connected to a slack take-up means indicated at 128. The slack take-up means forms the subject-matter of a co-pending application filed by Amiel G. Hutzley, see Letters Patent No. 1,690,681. 129 indicates a cable one end of which is arranged to wind on and off the other drum 122 and to extend to and around a sheave 130 supported on a shaft 130a carried by the bars 99 and then to and around a sheave 131 on the shaft 126a, its opposite end being anchored in any desired manner, preferably on the shaft 130a. By rotating the drum 122 to which the cable 129 is connected to wind it thereon the guide frame will swing to the position shown in dotted lines in Fig. 15; and by rotating the drum to pay out the cable, the guide frame will swing to its vertical or normal position. The gripping or clamping means 120 comprise a rocker 132 trunnioned on a traverse rod 133 which is supported at its ends in openings formed in the plates 114. The rocker 132 carries at one end a load clamping device 134 and at its opposite end a shaft 135 on which the sheave 127 is loosely mounted. 136 indicates a plurality of springs interposed between a rod 137 carried by the rocker frame 132 and the connecting device 116 and normally operating to swing the outer end of the rocker frame 132 upwardly and its inner end downwardly, as shown in full lines in Fig. 15. However, when the power means is operated to lift the load, the pull on the cable 125 will first be effective through the sheave 127 to rock the frame 132 and thus move the device 134 into engagement with the load, as shown in dotted lines in Fig. 15, and as the pull by the cable on the sheave 127 continues it will raise the elevating member 105 and maintain the device 134 in clamping engagement with the load.

I prefer to provide a limit switch mechanism 105b for stopping the motor 121 when the elevating member reaches the end of its movement vertically in either direction and a limit switch mechanism 102a for stopping the motor 121 when the guide frame reaches the end of its swinging movement in either direction.

To those skilled in the art to which my invention relates, many changes in construction and widely differing embodiments and applications thereof will suggest themselves without departing from the scope of the invention. My disclosures and the description herein are purely illustrative and are not intended to be in any sense limiting.

What I claim is:

1. In an industrial truck, a truck frame having a driving and steering section and a load carrying section comprising a relatively low horizontal frame and a connector between said sections, said connector being carried by one of said sections and connected to the inner end of the other section by a universal joint to permit articulation of said sections one relative to the other, a pair of traction wheels for supporting one end of said driving and steering section, a steerable wheel for supporting the other end of said driving and steering section, a pair of wheels co-operating with said connector to support said load carrying section, said frame sections being operable as a unitary structure in either direction and said driving and steering section being operable to maneuver said load carrying section at angles to said driving and steering section, a load handling mechanism on said load carrying section, said mechanism including a load lifting member adapted to be projected below a load when the truck is driven forwardly, means for operating said member, and devices on said driving and steering section for controlling the operation of said mechanism and steering said steerable wheel.

2. In an industrial truck, a truck frame having a driving and steering section and a load carrying section comprising a relatively low horizontal frame and a connector between said sections, said connector being carried by said first mentioned section and connected to the inner end of said last mentioned section by a universal joint to permit articulation of said sections one relative to the other, a pair of traction wheels for supporting the inner end of said driving and steering section, a steerable wheel for supporting the outer end of said driving and steering section, a pair of wheels co-operating with said connector to support said load carrying section, said frame sections being operable as a unitary structure in either direction and said driving and steering section being operable to manuever said load carrying section at angles to said driving and steering section, a load handling mechanism on said load carrying section, said mechanism including a load lifting member adapted to be projected below a load when the truck is driven forwardly, means for operating said member, and devices on said driving and steering section for controlling the operation of said mechanism and steering said steerable wheel.

EDWARD H. REMDE.